Patented Nov. 22, 1949

2,488,550

UNITED STATES PATENT OFFICE 2,488,550

SALTS OF UNSATURATED ACID-BRANCHED CHAIN HEXADIENE POLYMER ADDUCTS

Rupert C. Morris, Berkeley, and John L. Van Winkle, San Lorenzo, Calif., assignors to Shell Development Company, San Francisco, Calif., a corporation of Delaware No Drawing. Application April 30, 1948, Serial No. 24,448

8 Claims. (Cl. 260—429)

This invention relates to novel salt compositions and it is particularly directed to salts formed from adducts of various unsaturated acids, or their salt-forming derivatives, and low molecular weight, cyclic polymers of branched chain hexadienes.

This application is a continuation-in-part of our co-pending application, Serial No. 562,743, filed November 9, 1944, now U. S. Patent No. 2,422,740.

We have discovered that the salts formed by reacting suitable polyvalent metal compounds with the adducts formed, in turn, by reacting alpha, beta-unsaturated-alpha, beta-dicarboxylic acids or their salt-forming derivatives with low molecular weight, cyclic polymers of branched chain hexadienes having in the molecule a straight chain of five carbon atoms, are particularly useful compounds possessing a wide variety of unusual and unexpected properties. For example, they are valuble both as driers and as resins in various protective coating compositions. In addition, they are effective biocides and as such are valuable ingredients in many insecticidal compositions.

The low molecular weight, cyclic polymers mentioned above are described in detail in our copending application, Serial No. 562,051, filed November 4, 1944, now U. S. Patent No. 2,429,582, issued October 21, 1947, as well as in the aforesaid parent application, Serial No. 562,743, and while reference is hereby made to said applications for a more complete disclosure on the score of the polymers, it may here be noted that one method of preparing the same is to polymerize a branch chain, 1,3-hexadiene, having a straight chain of five carbon atoms, in the presence of sulfur dioxide and of either oxygen or an oxygen-yielding compound as catalyst. The polymerization is preferably conducted at elevated temperatures, as 80° C. or above, and with a mixture of hexadienes, as 2-methyl-1,3-pentadiene and 4-methyl-1,3-pentadiene. Preferred oxygen-yielding catalysts for this purpose are such peroxides as benzoyl peroxide, tertiary butyl hydroperoxide, and di-(tertiary butyl)-peroxide. An appreciable yield of polymers may be obtained when only traces of peroxide are present. Amounts as small as about 5 milli-equivalents of active oxygen per liter of liquid hexadiene may be sufficient, though improved yields are obtained through the use of between 10 and 100 milli-equivalents of active oxygen per liter of liquid hexadiene. The amount of sulfur dioxide employed may be varied over a wide range, though it is preferred to use at least one mol of this compound per mol of hexadiene reactant.

The low molecular weight polymers can also be produced by the thermal cracking of one or more di-methyl-sulfolenes. The latter compounds are cyclic monosulfones which are obtainable by reacting in the liquid phase one or more of the aforedesignated hexadienes (preferably peroxide-free) with sulfur-dioxide, in the substantial absence of molecular oxygen and of oxygen-yielding substances, the reaction being conducted at an elevated temperature which is below that at which the mono-sulfones formed are decomposed. Temperatures in the neighborhood of 100° C. are generally suitable. This method of preparing cyclic mono-sulfones is described in U. S. Patent No. 2,420,834, issued May 20, 1947, and forms no part of the present invention. Typical, suitable cyclic mono-sulfones which may be employed in this manner are 2,2-dimethyl-3-sulfolene, 2,4-dimethyl-3-sulfolene and 2,5-dimethyl-3-sulfolene. The term "sulfolene" is employed herein to designate the unsaturated compound containing four carbon atoms and a sulfur atom in a ring, said structure having a single olefinic linkage between two adjoining carbon atoms, with the sulfur atom having two oxygen atoms attached thereto and with the remaining free bonds of the nuclear carbon atoms being attached to hydrogen atoms. The term is normally prefixed by either 2- or 3- so as to indicate the position of the double bond. This compound has also been termed "thiacyclopentene-1,1-dioxide". In accordance with well recognized nomenclature practice, the term 2- or 3-sulfolene may also form a part of the name of particular compounds wherein one or more of the hydrogen atoms attached to the carbon-sulfur nucleus of the cyclic sulfone compound are substituted by a corresponding number of other functional groups in the numbered position of the ring indicated in the case of each particular compound.

The crude product obtained either from the designated monomeric hexadienes by polymerization in the presence of sulfur dioxide and of oxygen or oxygen-yielding substances, or by the cracking of dimethyl-sulfolenes, is a yellow viscous liquid consisting principally of a mixture of low molecular weight polymers of the hexadienes. It may contain a very small amount (a trace) of sulfur-containing impurities and of unreacted hexadienes. These impurities can be removed and a stable, more uniform product obtained simply by maintaining the polymers at an elevated temperature, desirably 200° to 225° C., preferably er atmospheric or reduced pressures. Heating for 2 to 4 hours is ordinarily satisfactory, though shorter or longer periods may be employed. The thus purified mixture of polymers gives a negative test for sulfur and sulfur-containing compounds. The mixture of polymers may be separated into several fractions by distillation, preferably under reduced pressures, or by other methods such as solvent extraction, etc. Fractions boiling below about 380° C. under atmospheric pressures consist principally of dimers, trimers and tetramers (which contain cyclic structures), of the hexadienes. Approximately ⅔ of the polymeric substance boils above about 380° C. under atmospheric pressures and consists essentially of a mixture of polymers the average, apparent molecular weight of which is substantially equal to that of a seven-unit polymer (having a polymerization degree of about seven) containing in the molecule the structure

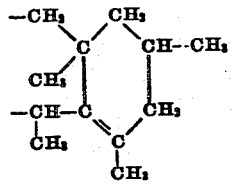

This higher molecular weight fraction is obtained as a yellow, very viscous, sticky liquid, soluble in hydrocarbons. For most purposes the mixture of polymers need not be fractionated but may be employed as such. If desired, however, any fraction or combination of fractions may be used in place of the whole mixture.

The aforesaid hexadiene polymers may be reacted with substantially any alpha,beta-unsaturated-alpha,beta-dicarboxylic acid or salt-forming derivative thereof in order to produce the polymer-acid adducts from which the salts of this invention are prepared. Relatively low molecular weight unsaturated acids having not more than about 8 carbon atoms in the molecule are preferred because of their greater reactivity. However, where the speed of reaction with the polymers is not of primary importance higher acids may be employed. It has been found that the most useful adducts are produced from acid reactants or their derivatives having at least one hydrogen atom attached directly to the alpha or beta carbon atom. In the case of compounds having a "cis" configuration with respect to the carboxyl groups, it is preferred to use the acid anhydrides, rather than the acids themselves or other derivatives thereof. Representative examples of preferred acid anhydride reactants are maleic anhydride, monochloromaleic anhydride, citraconic anhydride, itaconic anhydride, and the like. The corresponding acids of the foregoing anhydrides, or other acids such as fumaric acid, acetylenedicarboxylic acid, etc., as well as the various salt-forming derivatives of these and like compounds may be employed. Mixtures of two or more such unsaturated acid reactants (which term includes the acids, anhydrides, acyl halides, and other salt-forming derivatives here described) may also be employed. For technical and economic reasons maleic anhydride is the preferred reactant.

The amount of alpha,beta-unsaturated-alpha,beta-dicarboxylic acid which may be reacted with the low molecular weight cyclic hexadiene polymers may be varied over a wide range. The properties of the polymers are significantly altered and valuable products are produced where ratios as small as about one mol of alpha,beta-unsaturated-alpha,beta-dicarboxylic acid are employed for each about 120 carbon atoms of polymer, i. e., for each 20 hexadiene units combined in the polymer. Such products have improved body, faster drying and/or high oil solubility. Ratios as high as about one molecule of dicarboxylic acid to each hexadiene unit may be employed. The reaction may be carried out in a simple manner by merely intimately mixing the cyclic polymer and the alpha,beta-unsaturated-alpha,beta-dicarboxylic acid and heating the mixture under atmospheric pressures. If desired, one or both of the reactants may be added portion-wise to the reaction mixture at intervals during the reaction, although this procedure is ordinarily not necessary. Under most conditions no appreciable reaction occurs at temperatures below about 175° C., although such lower temperatures may be suitable in some cases. Temperatures of between about 175° C. and about 200° C. are preferred. Higher temperatures ordinarily cause discoloration of the product, particularly where oxygen is present during the reaction. However, where light color is not of primary consideration, temperatures as high as about 300° C. may be employed. The reaction may be carried out in a continuous or discontinuous manner. Atmospheric pressures are ordinarily satisfactory, although superatmospheric pressures may be employed and reduced pressures may be advantageous under some conditions. Where the reaction is carried out under atmospheric pressures reflux conditions may be provided. Gaseous oxygen may be present, although products of somewhat improved color may be obtained by excluding oxygen conveniently by providing the reaction mixture with a blanket of an oxygen-free fluid, e. g., an oxygen-free gas such as nitrogen, carbon dioxide, etc. The time required for the reaction is dependent upon the particular reactants involved, the reaction temperature, etc. With the more reactive acid reactants such as maleic anhydride, the reaction may be substantially complete in an hour or less. In other cases much longer heating times may be required. The preferred procedure in all cases where the initial reaction mixture consists essentially only of cyclic polymers and acid anhydride reactants is to continue heating until a mixture is obtained which on cooling remains in one liquid phase.

Following the reaction, the addition products of the cyclic polymers with the acid reactants may be separated from any other ingredients of the reaction mixture and further purified by any suitable known or special methods. Unreacted acid reactants may usually be removed by distillation, preferably under reduced pressures. Alternatively, unreacted acids and anhydrides may be removed by washing with hot water. Further purification may be effected by solvent extraction and the like.

The above-described polymer-acid addition products employed in forming the salts of this invention vary in viscosity from readily mobile liquids to hard, brittle solids, depending principally upon the nature and the proportions of the reactants. In the case of the reaction of maleic anhydride with an unfractionated mixture of low molecular weight cyclic hexadiene polymers such as may be obtained by the cracking of a dimethylsulfolene or by the reaction of a suitable hexadiene under the designated conditions, the influence of the relative proportions of anhydride and polymer in the adduct upon the properties thereof is shown in the following table:

| Reactants | | Polymer-Acid Adduct | | |
|---|---|---|---|---|
| Maleic Anhydride, Mols | Hexadiene (combined in polymer), Mols | Viscosity | Solubility | |
| | | | In Dilute Alkali | In Mineral Oil [1] |
| 1 | 2 | Hard solid | Readily soluble | Slightly soluble. |
| 1 | 3 | do | Soluble | Do. |
| 1 | 4 | Tacky solid | do | Soluble. |
| 1 | 10 | Viscous liquid | Slightly soluble | Readily soluble. |

[1] Water-white mineral oil consisting principally of saturated aliphatic hydrocarbons.

Representative analyses show that the above addition products correspond to the formula $$[(C_6H_{10})_y C_4H_2O_3]_x$$

wherein $y$ represents the ratio of hexadiene monomer units to each mol of maleic anhydride in the adduct, and $x$ is that number which, when multiplied by $y$, gives as product the number of hexadiene monomer units in the molecule. Knowing the molecular weight (M) of the polymer (or its average molecular weight), and the number of hexadiene monomer units remaining the same in both polymer and adduct molecules (averaging about 7.5 with unfractionated polymer mixtures), then $x$ is equal to $$\frac{M}{82y}$$

where 82 is the molecular weight of hexadiene. Conversion of the polymer-anhydride addition products to the acid form may be effected readily by heating a solution of the anhydride product in dilute aqueous alkali for a short time, followed by acidification and recovery of the precipitated acid product. Other methods will be obvious to those skilled in the art.

The salt compounds of the present invention are produced by known standard procedures employing as reactants the polymer-acid adducts of the type described above and an appropriate compound incorporating a polyvalent metal. Compounds of the "drier metals" are preferred, examples of such metals being cobalt, manganese, cerium, lead, iron, copper, nickel, vanadium, chromium, calcium, aluminum, cadmium, zinc and tin. Of these metals zinc, lead, cobalt, manganese and iron are preferred components of the salts of the present invention. Suitable polyvalent metal compounds for reaction with the polymer-acid adducts described above include the oxides, hydroxides, inorganic salts, and salts with inorganic acids of between 1 and 20 carbon atoms, those having from 2 to 6 carbon atoms being preferred. Representative compounds of this variety include zinc acetate, zinc oxide, lead oxide, lead acetate, cobalt oxide, manganese oxide, iron oxide, manganese acetate, aluminum oxide, aluminum hydroxide and the like.

Any known method of forming the salts may be employed. Thus, the metallic compound, as the hydroxide, oxide, or acetate, for example, may be refluxed at elevated temperatures (preferably between 125 and 325° C.) with an acid-polymer adduct, which term is taken to mean adducts embodying an acid, acid anhydride, ester or other salt-forming acid derivative. If the resulting salt of the adduct is insoluble, it may be recovered as a precipitate in the usual manner, while if soluble, the salt may be recovered on evaporating the solvent. Another procedure for preparing the metal salts of the invention is first to dissolve the adduct in a solvent, whereupon the dissolved adduct is neutralized as with sodium hydroxide. The resulting sodium salt is thereafter reacted with the desired polyvalent metal compound, as, for example, a salt of a lower organic acid, the desired salt here being formed by metathesis. Any other of the methods commonly employed in the formation of salts of organic acids may also be used.

The proportions in which the adduct and the polyvalent metal-containing compound are combined to form the salts of the present invention are not critical, though it is preferred that the reaction be conducted under such circumstances as to give rise to the maximum possible number of salt linkages consonant with the relative amount of acid present in the adduct.

The following examples illustrate the manner in which the present invention finds preferred embodiment:

*Example I*

Hexadiene polymer was produced by placing 2,4-dimethyl-3-sulfolene (prepared, for example, by a practice of the method set forth in detail in either of Examples VI or VII of the aforementioned U. S. Patent No. 2,420,834) in a glass reaction kettle under a water-cooled reflux condenser which was open to the atmosphere and the kettle was heated slowly. When the kettle temperature reached 87° C. decomposition of the sulfone was evident. The temperature was thereafter regulated to provide for the decomposition of the sulfone at such a rate that the sulfur dioxide evolved did not sweep any of the reactant or other products out of the kettle. Evolved sulfur dioxide was discarded. At the end of three hours, when the decomposition was substantially complete, the temperature had reached 151° C. Heating was continued for an additional four hours, the temperature being raised gradually to 191° C. The residue was a crude mixture of low molecular weight polymers and contained 0.006% of sulfur. The polymer was stabilized and purified by heating in an open vessel exposed to the air at 200–225° C. for four hours. No sulfur could be detected in the purified polymer.

In order to obtain a polymer-anhydride adduct suitable for conversion into the salt form, 898 parts of the hexadiene polymer produced as described above were heated in a glass reaction vessel under a reflux condenser in the absence of oxygen and in the presence of nitrogen until a temperature of 193° C. was obtained. Maleic anhydride (18 parts) was then added and the mixture heated for 2.5 hours at 170 to 175° C. and then for 8 hours at 180° C. The mixture was cooled to 150° C. and 4.1 parts of hydrated manganous acetate [Mn(CH$_3$COO)$_2$.4H$_2$O] were added. The resulting mixture was held at 150° C. with stirring for 10 hours, at the end of which time the reaction was deemed complete and the mixture was filtered under reduced pressure.

The filtrate, which contained the desired manganese salt, gave the following analysis:

Manganese _____ 1% by weight
Molecular weight _____ 695 (ebulloscopic in benzene)
Viscosity at 25° C_____ 32,000 centistokes The manganese salt of the polymer-acid adduct prepared as here described was readily oxidizable, so much so that spontaneous combustion of a portion of the filtrate occurred. The salt had excellent drying qualities when used with various coating compositions.

Example II

The cobalt salt of the adduct of Example I is prepared in the manner there described for the manganese salt except that here cobalt caproate is substituted for the manganese acetate.

Example III

The iron salt of the adduct described in Example I is prepared by substituting ferrous acetate for manganese acetate in the process set forth in that example.

Molecular weights referred to herein were determined according to the method described by B. J. Mair in the Bureau of Standards Journal of Research, 14, 345 (1935). The term "unsaturated" as used herein refers to carbon-to-carbon unsaturation of aliphatic character.

We claim as our invention:

1. A salt of a polyvalent drier metal and an addition product made up of a compound selected from the group consisting of alpha,beta-unsaturated-alpha,beta-dicarboxylic aliphatic acids and their anhydrides in combination with a low molecular weight unsaturated cyclic polymer of a branch-chain, 1,3-hexadiene having a straight chain of 5 carbon atoms in the molecule.

2. The compound of claim 1 wherein the metal is manganese.

3. The compound of claim 1 wherein the metal is cobalt.

4. The compound of claim 1 wherein the metal is iron.

5. A salt of a polyvalent drier metal and an addition product of maleic anhydride and a low molecular weight unsaturated cyclic polymer of a branch-chain 1,3-hexadiene having a straight chain of 5 carbon atoms in the molecule.

6. The compound of claim 5 wherein the metal is manganese.

7. The compound of claim 5 wherein the metal is cobalt.

8. The compound of claim 5 wherein the metal is iron.

RUPERT C. MORRIS.
JOHN L. VAN WINKLE.

No references cited.

Certificate of Correction

Patent No. 2,488,550 November 22, 1949

RUPERT C. MORRIS ET AL.

It is hereby certified that error appears in the printed specification of the above numbered patent requiring correction as follows:

Column 1, line 10, for the patent number "2,422,740" read *2,468,769*;

and that the said Letters Patent should be read with this correction therein that the same may conform to the record of the case in the Patent Office.

Signed and sealed this 15th day of August, A. D. 1950.

[SEAL]

THOMAS F. MURPHY,
*Assistant Commissioner of Patents.*